United States Patent
Haley et al.

(10) Patent No.: US 6,450,872 B1
(45) Date of Patent: Sep. 17, 2002

(54) APPARATUS AND METHOD FOR CUTTING POULTRY PAWS

(75) Inventors: Bobby Z. Haley, Fayetteville; William D. Royall, Lowell; Brandon C. Haley, Springdale; Virendra K. Bhumbla, Fayetteville, all of AR (US)

(73) Assignee: Tyson Foods, Inc., Springdale, AR (US)

( * ) Notice: Subject to any disclaimer, the term of this patent is extended or adjusted under 35 U.S.C. 154(b) by 27 days.

(21) Appl. No.: 09/686,543

(22) Filed: Oct. 11, 2000

(51) Int. Cl.[7] .............................................. A22C 21/00
(52) U.S. Cl. ....................................... 452/166; 452/167
(58) Field of Search .................................. 452/166, 167, 452/164, 163, 170, 172, 178, 182; 30/353, 357

(56) References Cited

U.S. PATENT DOCUMENTS

| | | | | |
|---|---|---|---|---|
| 2,715,748 A | * | 8/1955 | Celillo | 452/166 |
| 5,078,644 A | * | 1/1992 | DiGerlando | 452/169 |
| 5,366,406 A | * | 11/1994 | Hobbel et al. | 452/179 |
| 5,460,567 A | * | 10/1995 | Tieleman et al. | 452/167 |
| 6,179,702 B1 | * | 1/2001 | Hazenbroek | 452/188 |
| 6,283,848 B1 | * | 9/2001 | Berry | 452/166 |

FOREIGN PATENT DOCUMENTS

FR          2679417 A1   *  1/1993

* cited by examiner

Primary Examiner—Peter M. Poon
Assistant Examiner—David Parsley
(74) Attorney, Agent, or Firm—Fellers, Snider, Blankenship, Bailey & Tippens, P.C.

(57) ABSTRACT

A method and apparatus for cutting poultry paws. The inventive method comprises the steps of (a) placing the poultry paws in a rotating wheel and (b) cutting the poultry paws as the paws are carried by the rotating wheel. The inventive apparatus comprises: (a) a rotatably drivable wheel having a perimeter and having notches provided in the perimeter wherein the poultry paws are receivable and (b) a blade positioned with respect to the wheel such that the blade will cut the poultry paws as the paws are carried by the wheel.

11 Claims, 7 Drawing Sheets

APPARATUS AND METHOD FOR CUTTING POULTRY PAWS

FIELD OF THE INVENTION

The present invention relates to methods and apparatuses for cutting poultry paws.

BACKGROUND OF THE INVENTION

The United States poultry industry produces hundreds of thousands of pounds of chicken paws each year. Most of these products are exported for consumption overseas. One of the most important quality parameters for these paw products are the length of the overhanging tendons left in the paws. The best quality paws will have tendon lengths of one-quarter inch or less.

Unfortunately, the paw-cutting/trimming devices heretofore employed in the art have not been able to consistently and uniformly provide the quality of product cut desired. The prior art paw-cutting devices are primarily designed to cut the paws as they are being carried by a shackle-type conveyor.

Thus, a need presently exists for a paw-cutting system which will consistently and uniformly provide a high quality product having few overhanging tendons. Of course, such system would also preferably cost no more to build, install, and maintain than the cutting devices heretofore used in the art.

SUMMARY OF THE INVENTION

The present invention satisfies the needs and alleviates the problems discussed hereinabove. In one aspect, the invention provides a method of cutting poultry paws comprising the steps of: (a) placing the poultry paws in a rotating wheel and (b) cutting the poultry paws as the poultry paws are carried by the rotating wheel. In another aspect, the invention provides an apparatus for cutting poultry paws comprising: (a) a rotatably drivable wheel having a perimeter and having notches provided in the perimeter wherein the poultry paws are receivable and (b) a blade positioned with respect to the wheel such that the blade will cut the poultry paws as the paws are carried by the wheel. The inventive system also preferably includes means for continuously and automatically transferring the poultry paws to the rotating wheel from a shackle conveyor.

The inventive system costs no more than existing paw cutters, is very simple to construct, install, operate, and maintain, provides a more consistent, uniform, high quality product having fewer overhanging tendons, and significantly improves product yield. The inventive system also preferably operates to securely support the poultry paws on each side of the cutting blade such that a particularly smooth and consistent cut is obtained.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENTS

Figure 1:
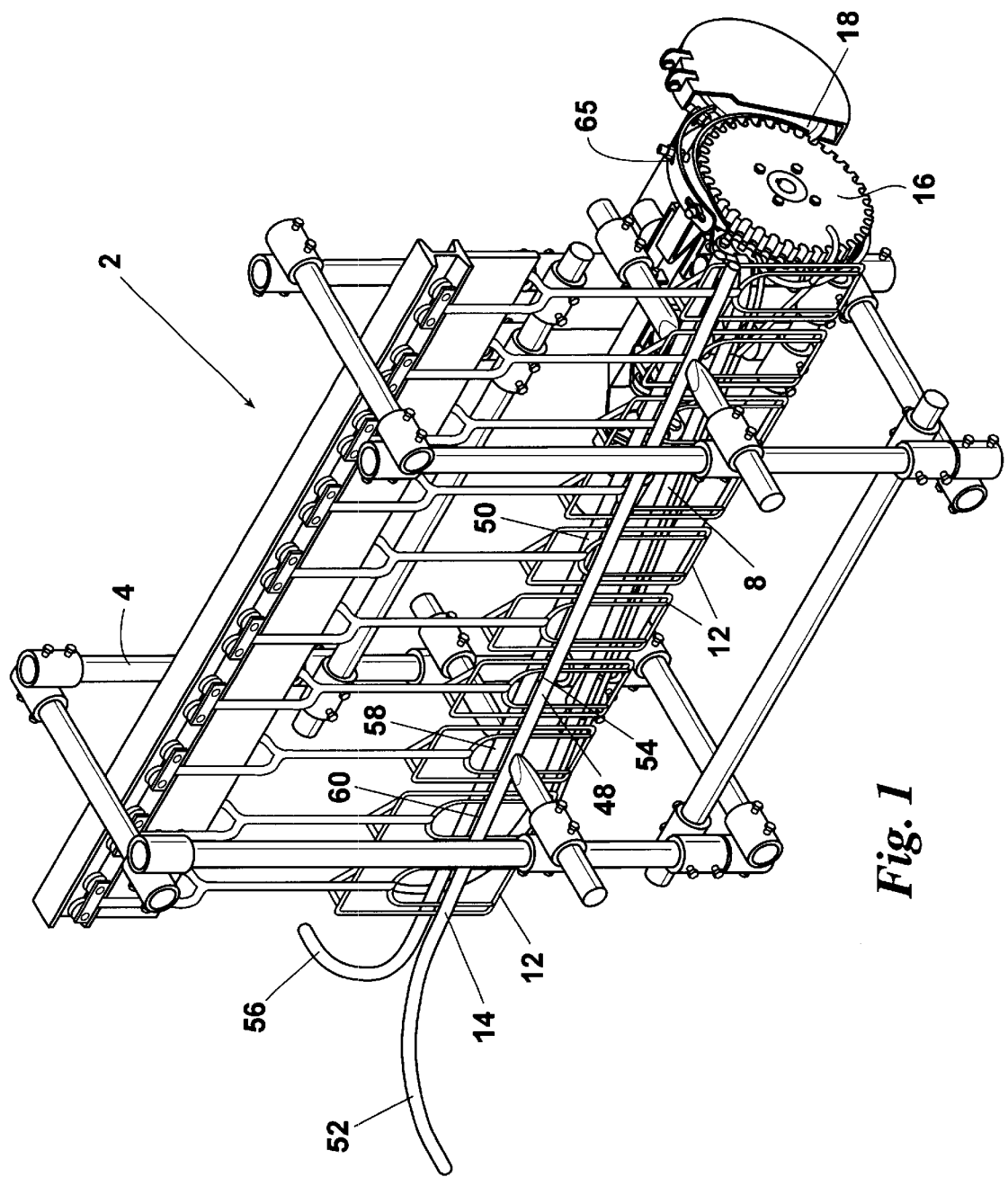
FIG. 1 provides a perspective view of embodiment 2 of the inventive paw cutting apparatus.

An embodiment 2 of the inventive paw-cutting apparatus is depicted in FIGS. 1–4. Inventive paw-cutter 2 preferably comprises: a frame structure 4 for retaining the various components of the inventive apparatus and for mounting inventive apparatus 2 on a shackle conveyor line 6; a first track 8 which lifts and removes paws 10 from the shackles 12; a second track 14 through which shackles 12 are conveyed in order to stabilize the shackles 12 as paws 10 are lifted and removed therefrom; a notched, rotatably drivable wheel 16 which receives paws 10 from first track 8 and carries paws 10 during the cutting operation; a blade 18 (preferably a rotating blade) for cutting paws 10 as they are carried by wheel 16; and a drive system 20 for rotatably driving wheel 16 and blade 18.

The lifting track 8 is positioned behind (i.e., on the knee joint side of) shackles 12 and comprises: a lower rod or bar 22 having a downwardly curved initial portion 24, an elongate upwardly inclined central portion 26, and an end portion 28 which curves rearwardly toward wheel 16; an upper rod or bar 30 positioned above lower rod 22 and having an upwardly curved initial portion 32, an elongate, upwardly inclined central portion 34 which runs parallel to the central portion 26 of lower rod 22, and an upper end portion 36 which curves rearwardly toward wheel 16; and a gap 38 defined between the elongate central portions 26 and 34 and the curved upper end portions 28 and 36 of lower and upper rods 22 and 30. Upper rod/bar 30 is spaced upwardly from lower rod/bar 22 a sufficient distance such that (a) gap 38 will slidably receive the leg portions 40 of the uncut paws 10 but (b) is narrow enough to prevent the knee joints 42 of paws 10 from passing therethrough.

The downwardly curved and upwardly curved initial portions 24 and 32 of lower and upper rods 22 and 30 are shaped and positioned to guide the leg portions 40 of paws 10 into the gap 38 of lifting track 8 as the paws 10 are conveyed by shackles 12. With the leg portions 40 thus slidably received in the upwardly inclined portion 44 of gap 38, the lifting track 8 forces the paws 10 to move upwardly in shackles 12 as the paws 10 are being conveyed by shackle conveyor 6. Upon reaching the upper end of the inclined portion 44 of track 8, paws 10 are received in the upper, rearwardly curved portion 46 of gap 38.

Because the width of the knee joints 42 exceeds the width of gap 38, the lifted paws 10 are retained in the upper, rearwardly curved portion 46 of the track 8 and thus pulled from shackles 12 as shackle conveyor 6 continues to move forward. The resulting continuous accumulation of paws 10 at the upper curved end of track 8 causes the accumulating paws 10 to move rearwardly and drop, one at a time, from the upper end of track 8 into notched wheel 16.

Figure 2:
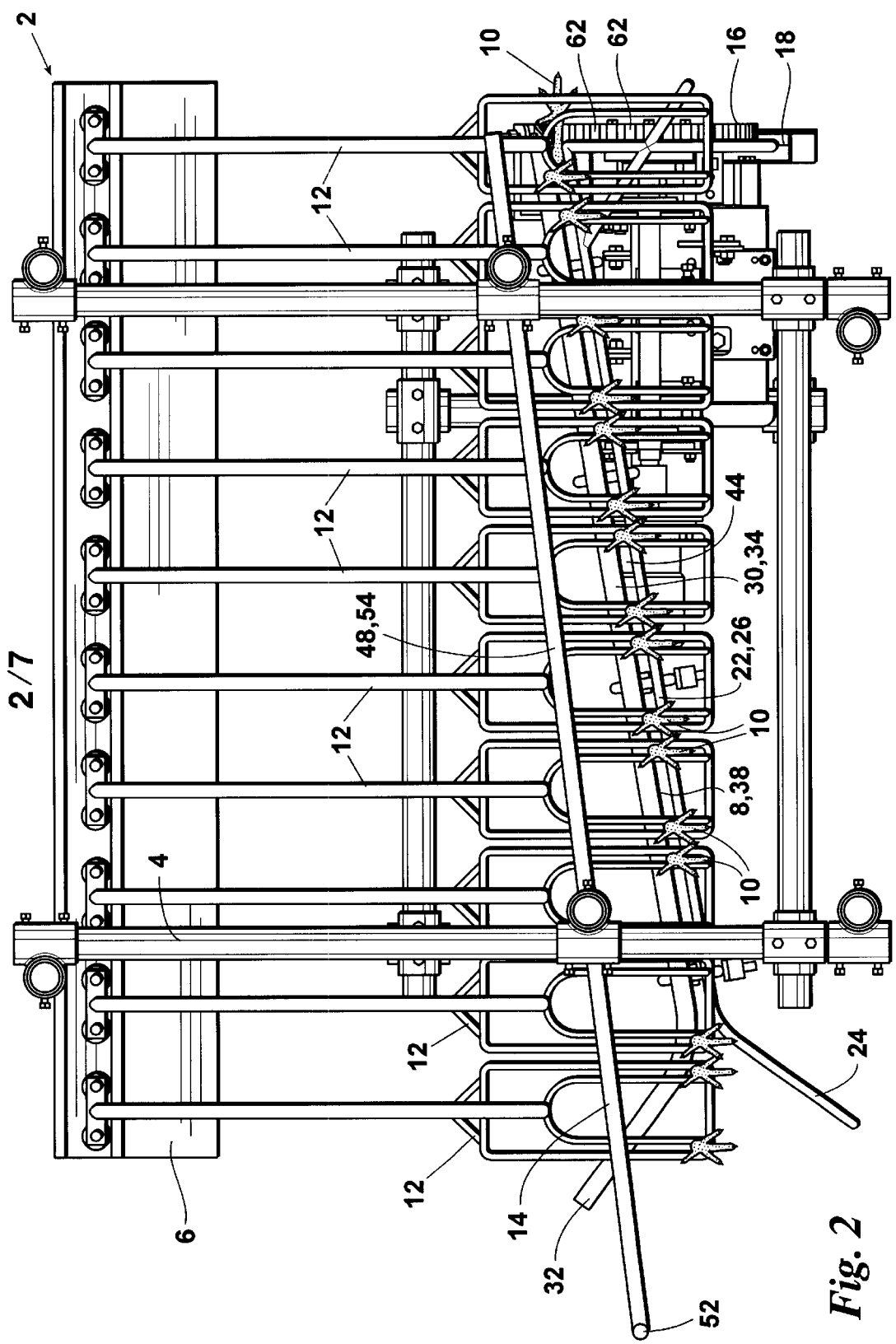
FIG. 2 provides a front elevational view of inventive apparatus 2.
Figure 3:
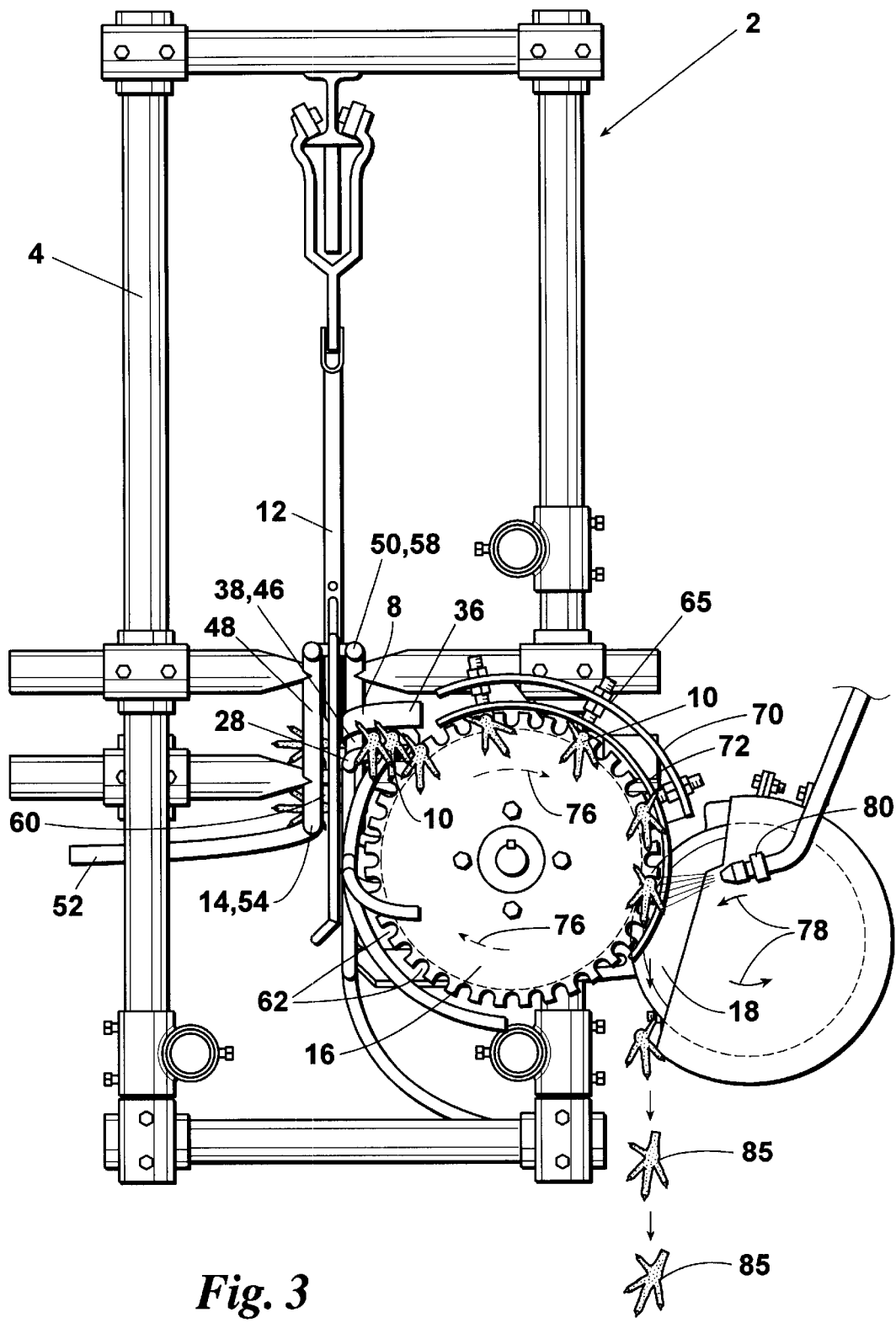
FIG. 3 provides an elevational end view of inventive apparatus 2.
Figure 4:
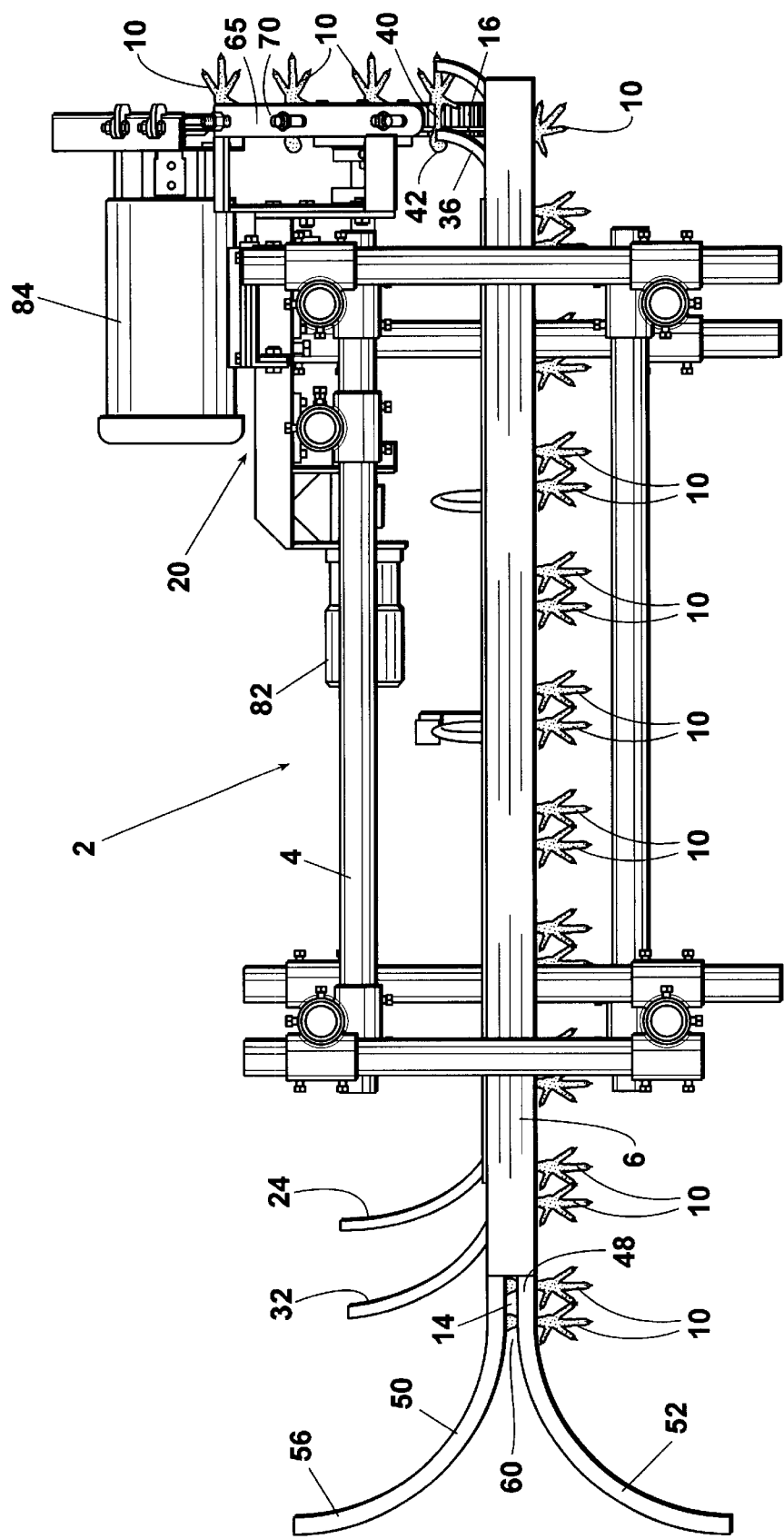
FIG. 4 provides a plan view of inventive apparatus 2.
Figure 5:
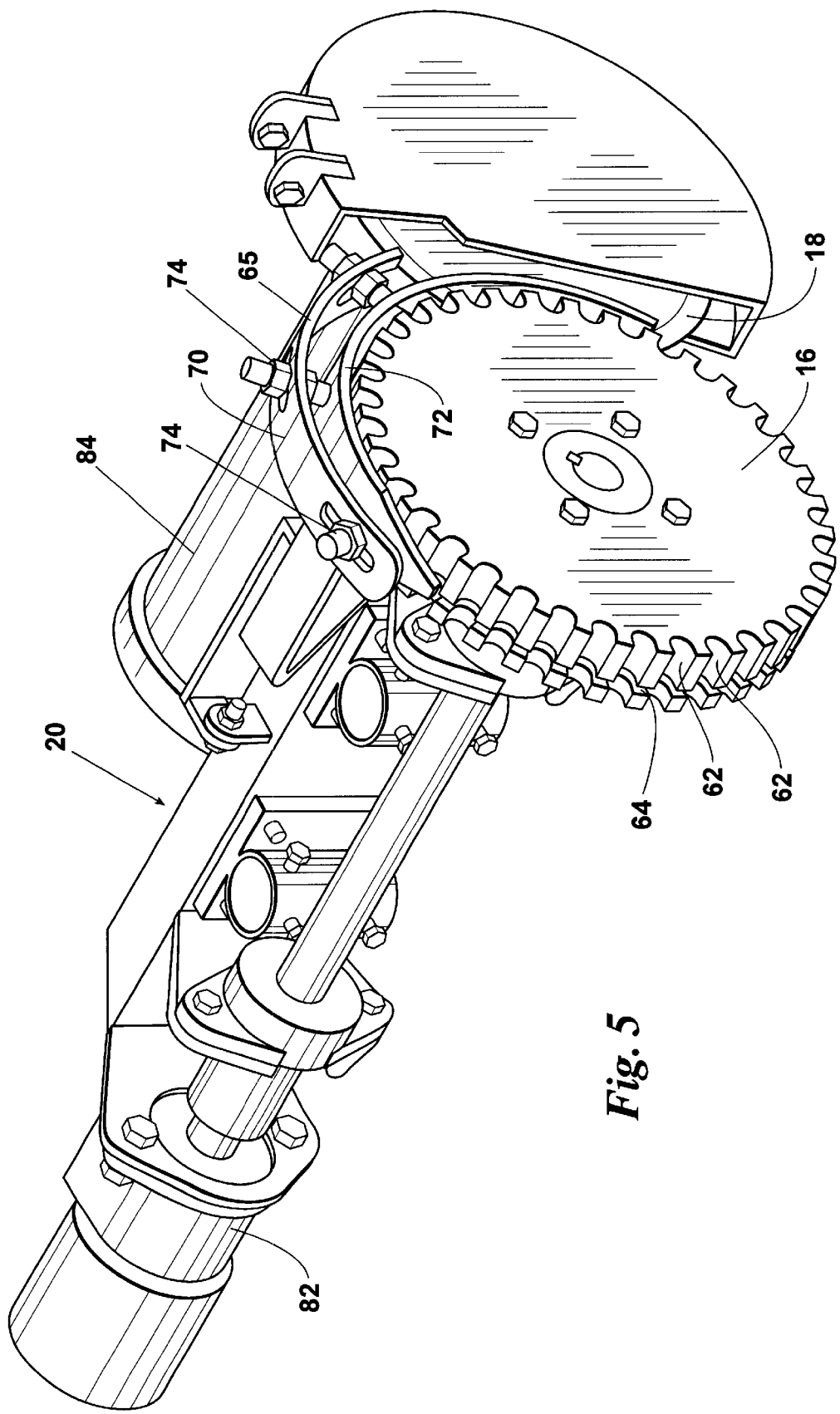
FIG. 5 provides a perspective view of the cutting assembly employed in inventive apparatus 2.
Figure 6:
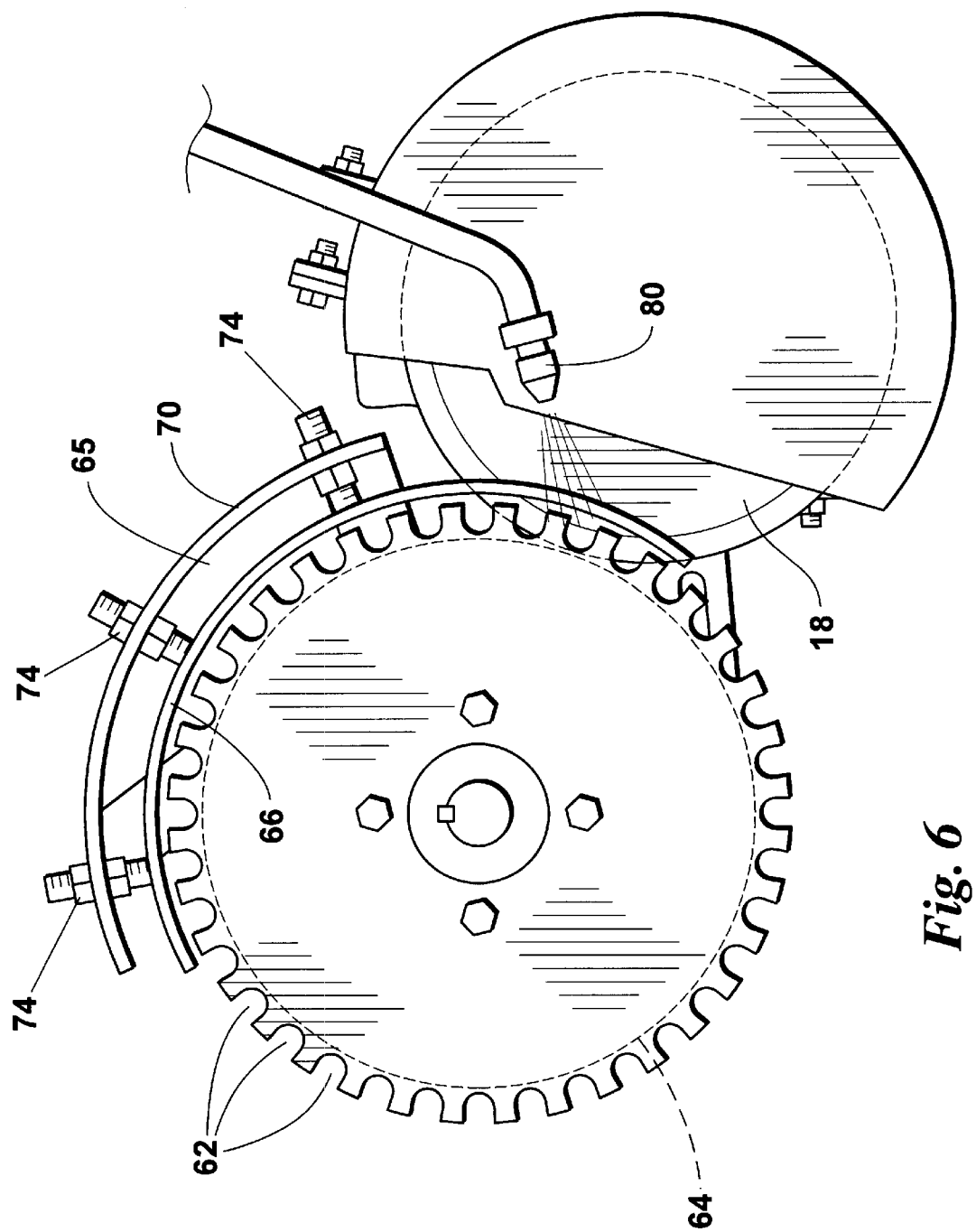
FIG. 6 provides an elevational end view of the cutting assembly employed in inventive apparatus 2.
Figure 7:
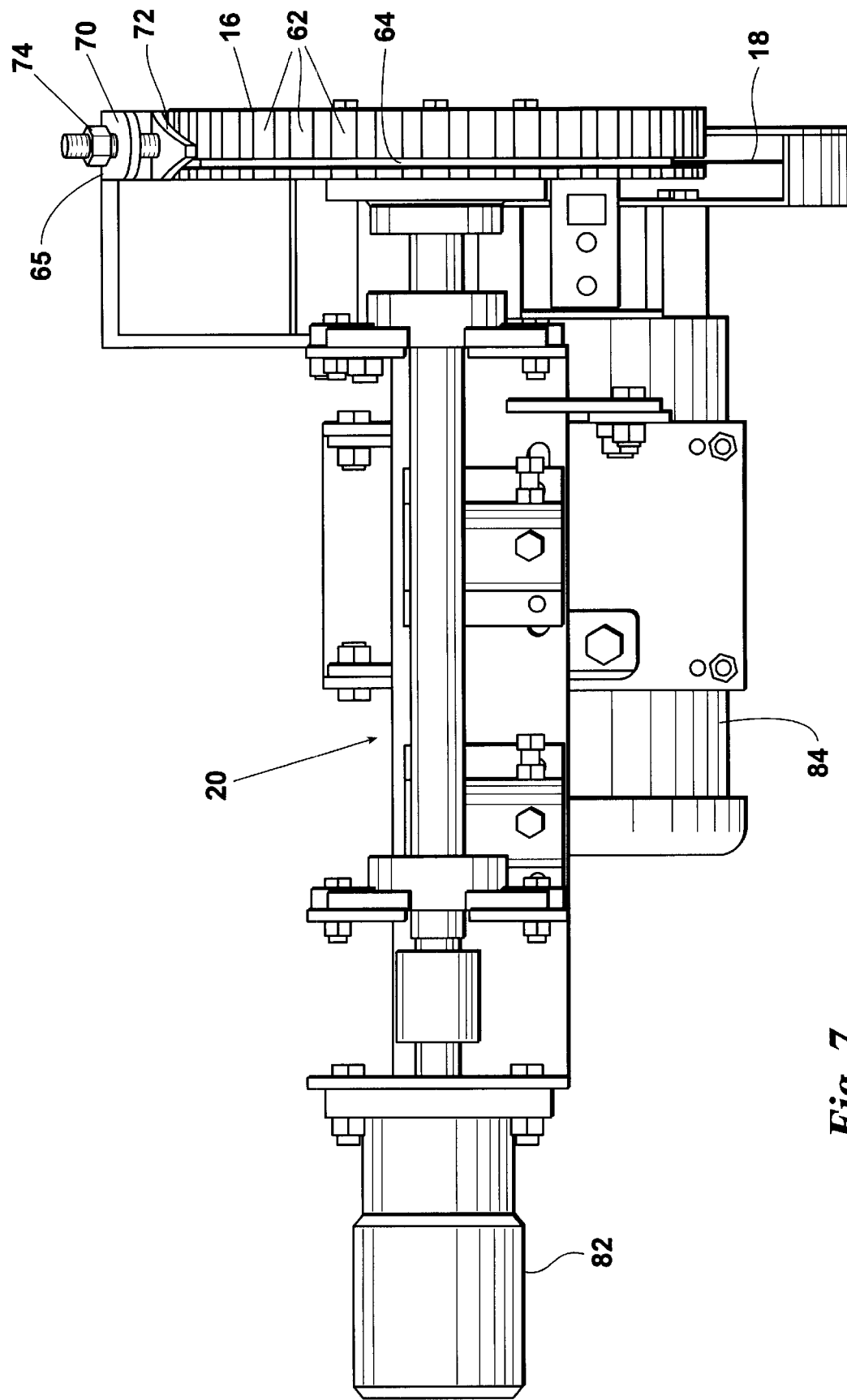
FIG. 7 provides an elevational front view of the cutting assembly employed in inventive apparatus 2.

The stabilizing track 14 included in inventive apparatus 2 operates to temporarily stabilize shackles 12 against swinging movement so that paws 10 can be guided into and lifted by track 8. Track 14 is preferably positioned above track 8 and is also preferably upwardly inclined as depicted in FIGS. 1–3. Track 14 preferably comprises a first bar or rod 48 positioned along the outer side of shackle conveyor 6 and a second bar or rod 50 positioned along the inner side of conveyor 6. Outer rod 48 preferably includes an outwardly curved initial portion 52 followed by an elongate straight segment 54. Straight segment 54 preferably extends to wheel 16. Inner rod 50 preferably comprises an inwardly curved initial portion 56 followed by an elongate straight segment 58. Straight segment 58 also preferably extends to wheel 16. The elongate straight segments 54 and 58 of rods 48 and 50 preferably run parallel to each other and are spaced apart a sufficient distance for receiving shackles 12 and stabilizing shackles 12 against swinging movement. The outwardly curved initial portions 52 and 56 of rods 48 and 50 are preferably sized and shaped for receiving and guiding shackles 12 into the gap 60 provided between the elongate segments 54 and 58 of rods 48 and 50.

The wheel 16 employed in the inventive apparatus is preferably positioned substantially perpendicular to shackle conveyor 6 such that the paws 10 dropping from the rearwardly curved upper portion 46 of first track 8 will drop into the lateral notches 62 formed around the perimeter of wheel 16. Wheel 16 preferably also includes a radial groove 64 formed around the perimeter of wheel 16 for receiving blade 18. Radial groove 64 preferably extends into the perimeter of wheel 16 a sufficient distance such that blade 18 will reach the innermost portions of notches 62. With blade 18 extending into groove 64 in this manner, wheel 16 operates to firmly retain and support paws 12 during the cutting operation on both sides of blade 18.

Inventive apparatus 2 also preferably includes a retaining structure 65 for retaining paws 10 in notches 62 as wheel 16 carries the paws 10 through blade 18. The retaining structure will preferably include a curved retaining surface 66 positionable adjacent to the outer perimeter of wheel 16. The particular retaining structure 65 employed in embodiment 2 of the inventive apparatus comprises: a curved stationary support 70 spaced apart from the outer perimeter of wheel 16; a curved retaining bar 72 which includes retaining surface 66; and a plurality of threaded attachments 74 or other structures which adjustably link retaining bar 72 to stationary support 70. Thus, retaining bar 72 can be selectively adjusted toward and away from the outer perimeter of wheel 16. Retaining bar 72 preferably extends over the uppermost portion of wheel 16 and downwardly alongside blade 18.

Blade 18 can be a straight blade, a rotating blade, or generally any other type of blade employed in the art. Blade 18 will preferably be a rotating blade which is driven in a direction opposite to that of wheel 16. For example, in inventive apparatus 2 as viewed in FIG. 2, wheel 16 will preferably be driven clockwise as indicated by arrows 76 and blade 18 will preferably be driven counterclockwise as indicated by arrow 78. To facilitate the cutting operation and to help clean the blade and cutting surfaces, a spray nozzle or similar device 80 will preferably be employed to continuously spray water on the cutting edge of blade 18.

As will be understood by those skilled in the art, generally any pneumatic, electric, or other motors or system(s) 20 can be used to drive wheel 16 and rotating blade 18. If desired, wheel 16 and/or blade 18 could even be driven by chain or belt linkage to shackle conveyor 6. In embodiment 2 of the inventive apparatus, wheel 16 and rotating blade 18 are independently driven by separate motors 82 and 84. Alternatively, a single motor could be used to drive both wheel 16 and blade 18 such that one of these rotating components is directly driven by the motor and the other is driven by a belt, gear, chain or other assembly.

As the paws 10 are cut by blade 18, the cut paw product 85 simply falls on one side of wheel 16 while the trimmed knee joint 42 falls on the other. The paw product 85 will preferably fall into a chute or other device (not shown) which will deliver product 85 to further processing and/or inspection stations.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of continuously and automatically removing poultry paws from a shackle conveyor and then cutting said poultry paws to remove knee joints therefrom, said shackle conveyor comprising a series of vertical shackles, each of said vertical shackles having a lower end portion wherein at least one of said poultry paws is retained and an upper portion, said method comprising the steps of:

(a) conveying said series of vertical shackles past a lifting track positioned on one side of said shackle conveyor, said lifting track comprising a lifting segment which is positioned adjacent to and is inclined upwardly with respect to said shackle conveyor and said lifting track further comprising an upper portion which extends outwardly away from said shackle conveyor, wherein said poultry paws are received in said lifting track as said series of vertical shackles travel past said lifting track, said poultry paws are lifted from said lower end portions to said upper portions of said shackles as said poultry paws travel along said lifting segment and said poultry paws are pulled from said upper portions of said shackles as said poultry paws are received in said upper portion of said lifting track;

(b) discharging said poultry paws from said upper portion of said lifting track into lateral notches extending laterally through a perimeter portion of a rotating wheel such that said poultry paws are laterally positioned across said perimeter portion of said rotating wheel, said wheel having a radial grove extending into said perimeter portion; and then (c) cutting said poultry paws to remove said knee joints therefrom using a blade extending into said radial groove.

2. The method of claim 1 wherein said blade is a rotating blade.

3. The method of claim 1 further comprising the step of stabilizing said shackles during at least a portion of step (a) to reduce swinging movement.

4. The method of claim 3 wherein said step of stabilizing comprises conveying said shackles through a stabilizing track positioned above said lifting track.

5. The method of claim 4 wherein said stabilizing track is inclined upwardly with respect to said shackle conveyor.

6. An apparatus for continuously and automatically removing poultry paws from a shackle conveyor and then cutting said poultry paws to remove knee joints therefrom, wherein said shackle conveyor will comprise a series of vertical shackles each having a lower end portion wherein at least one of said poultry paws will be retained and an upper portion, said apparatus comprising:

a lifting track positioned on one side of said shackle conveyor, said lifting track including a lifting segment positioned adjacent to and inclined upwardly with respect to said shackle conveyor and said lifting track further including an upper portion which extends outwardly away from said shackle conveyor, said lifting track being sized and positioned in a manner effective for (i) receiving said poultry paws when said series of vertical shackles travels past said lifting track, (ii) lining said poultry paws from said lower end portions to said upper portions of said shackles as said poultry paws travel along said lifting segment, and (iii) pulling said poultry paws from said upper portions of said shackles when said poultry paws are received in said upper portion of said lifting track;

a rotatable wheel having lateral notches extending laterally through a perimeter portion of said rotatable wheel, said rotatable wheel being positioned such that, when discharged from said upper portion of said lifting track, said poultry paws will be received in said lateral notches so that said poultry paws will be laterally positioned across said perimeter portion of said rotatable wheel;

a radial groove extending into said perimeter portion of said rotatable wheel; and a blade extending into said radial groove.

7. The apparatus of claim 6 wherein said blade is a rotatable blade.

8. The apparatus of claim 6 further comprising a stabilizing track for receiving said shackles and stabilizing said shackles to reduce swinging movement.

9. The apparatus of claim 8 wherein said stabilizing track is positioned above said lifting track.

10. The apparatus of claim 9 wherein said stabilizing track is inclined upwardly with respect to said shackle conveyor.

11. The apparatus of claim 6 further comprising a curved retaining member positioned adjacent said perimeter portion of said rotatable wheel for retaining said poultry paws in lateral position across said perimeter portion of said rotating wheel.

* * * * *

UNITED STATES PATENT AND TRADEMARK OFFICE
CERTIFICATE OF CORRECTION

PATENT NO.    : 6,450,872 B1
DATED         : September 17, 2002
INVENTOR(S)   : Haley et al.

It is certified that error appears in the above-identified patent and that said Letters Patent is hereby corrected as shown below:

Column 4,
Line 44, change the word "grove" to -- groove --.

Column 5,
Line 8, change the word "lining" to -- lifting --.

Signed and Sealed this

Thirty-first Day of December, 2002

JAMES E. ROGAN
*Director of the United States Patent and Trademark Office*